US012565937B2

(12) United States Patent
Yan et al.

(10) Patent No.:    US 12,565,937 B2
(45) Date of Patent:        Mar. 3, 2026

(54) MOUNTING STRUCTURE OF A VALVE CORE SEAT OF A PULL-OUT FAUCET, AND A PULL-OUT FAUCET WITH A SENSING FUNCTION COMPRISING SAID MOUNTING STRUCTURE

(71) Applicant: Xiamen Forbetter Sanitary Ware Co., Ltd., Fujian (CN)

(72) Inventors: Xiliang Yan, Fujian (CN); Yihui Chen, Fujian (CN); Mouyong Lin, Fujian (CN)

(73) Assignee: Xiamen Forbetter Sanitary Ware Co., Ltd., Fujian (CN)

( * ) Notice: Subject to any disclaimer, the term of this patent is extended or adjusted under 35 U.S.C. 154(b) by 32 days.

(21) Appl. No.: 18/732,661

(22) Filed: Jun. 4, 2024

(65) Prior Publication Data

US 2024/0318735 A1        Sep. 26, 2024

Related U.S. Application Data

(63) Continuation-in-part of application No. 17/938,901, filed on Sep. 6, 2022, now abandoned.

(30) Foreign Application Priority Data

Oct. 30, 2023      (CN) .......................... 202322924083.0

(51) Int. Cl.
*F16K 11/074*          (2006.01)
*E03C 1/04*            (2006.01)
(Continued)

(52) U.S. Cl.
CPC ............ *F16K 11/074* (2013.01); *E03C 1/057* (2013.01); *F16K 11/0743* (2013.01);
(Continued)

(58) Field of Classification Search
CPC .. F16K 11/0743; F16K 19/006; F16K 31/408; F16K 31/42; F16K 31/0617;
(Continued)

(56) References Cited

U.S. PATENT DOCUMENTS

| | | | | |
|---|---|---|---|---|
| 6,341,389 B2 * | 1/2002 | Philipps-Liebich | .... | F16K 31/02 251/129.04 |
| 6,757,921 B2 * | 7/2004 | Esche | ...................... | E03C 1/04 4/677 |

(Continued)

*Primary Examiner* — Matthew W Jellett
(74) *Attorney, Agent, or Firm* — Birchwood IP

(57)                ABSTRACT

A mounting structure of a valve core seat of a pull-out faucet in a faucet body which has a main pipe and a branch pipe communicating with each other; a restricting portion is protruded out radially into the branch pipe from an inner diameter of an end of the branch pipe in communication with the main pipe; one side of the valve core seat has a boss; a stepped surface is formed the valve core seat surrounding the boss; the valve core seat is inserted from a lower end of the main pipe and installed at a height corresponding to the branch pipe, and the boss is inserted into the branch pipe through a space enclosed by the restricting portion, and the stepped surface is locked and fixed to the restricting portion. A pull-out faucet having a sensing function that includes the above mounting structure is also disclosed.

15 Claims, 13 Drawing Sheets

(51) Int. Cl.

| | |
|---|---|
| *E03C 1/05* | (2006.01) |
| *F16K 11/00* | (2006.01) |
| *F16K 31/06* | (2006.01) |
| *F16K 31/40* | (2006.01) |
| *F16K 31/42* | (2006.01) |

(52) U.S. Cl.
CPC ........ *F16K 19/006* (2013.01); *F16K 31/0617* (2013.01); *F16K 31/408* (2013.01); *F16K 31/42* (2013.01); *E03C 2001/0415* (2013.01); *Y10T 137/86823* (2015.04); *Y10T 137/9464* (2015.04)

(58) Field of Classification Search
CPC .................. E03C 1/0404; E03C 1/057; E03C 2001/0415; Y10T 137/9464; Y10T 137/86823
See application file for complete search history.

(56) References Cited

U.S. PATENT DOCUMENTS

| | | | | |
|---|---|---|---|---|
| 7,464,418 | B2 * | 12/2008 | Seggio ...................... | E03C 1/05 251/129.04 |
| 7,533,683 | B2 * | 5/2009 | Ortega .................. | F16K 19/006 137/454.6 |
| 8,733,396 | B2 * | 5/2014 | Huang .................. | F16K 27/045 137/269 |
| 9,062,438 | B2 * | 6/2015 | Bares ........................ | E03C 1/04 |
| 9,175,458 | B2 * | 11/2015 | Meehan .................... | E03C 1/04 |
| 9,243,392 | B2 * | 1/2016 | Marty ..................... | H01C 1/01 |
| 10,234,049 | B1 * | 3/2019 | He ........................ | F16K 31/605 |
| 11,085,175 | B2 * | 8/2021 | Fourman .............. | E03C 1/0404 |
| 2004/0010848 | A1 * | 1/2004 | Esche ....................... | E03C 1/04 4/675 |
| 2008/0276367 | A1 * | 11/2008 | Bares ................... | F16K 19/006 4/677 |
| 2009/0094740 | A1 * | 4/2009 | Ji ........................... | E03C 1/057 137/624.11 |
| 2012/0018020 | A1 * | 1/2012 | Moore .................. | E03C 1/0403 137/801 |
| 2013/0276911 | A1 * | 10/2013 | Meehan .................. | E03C 1/055 137/355.16 |
| 2015/0013064 | A1 * | 1/2015 | Marty ..................... | H01C 1/14 4/668 |
| 2016/0215482 | A1 * | 7/2016 | Fourman .............. | E03C 1/0404 |
| 2021/0079633 | A1 * | 3/2021 | Lu ......................... | E03C 1/0403 |

* cited by examiner

FIG.10

MOUNTING STRUCTURE OF A VALVE CORE SEAT OF A PULL-OUT FAUCET, AND A PULL-OUT FAUCET WITH A SENSING FUNCTION COMPRISING SAID MOUNTING STRUCTURE

BACKGROUND OF THE INVENTION

The present invention relates to the technical field of pull-out faucets, and in particular, to a mounting structure of a valve core seat of a pull-out faucet, and a pull-out faucet with a sensing function comprising said mounting structure.

Faucets are devices that are used frequently in daily works and used for domestic purposes, and are widely installed in places such as kitchens and bathrooms.

A valve core seat is usually arranged in the faucet, serving as a junction between a valve core and the water inlet and outlet pipes, so as to facilitate the assembly of the faucet. In the related prior art, the valve core and the valve core seat are generally assembled as a whole, and then the assembled whole is mounted into a valve core hole of a branch pipe of the faucet body, and then connected to a water pipe inserted into the bottom of the faucet body. In order to provide a space for mounting the valve core seat and accessories thereon, the size of the valve core hole of the branch pipe is larger than that of the valve core seat. As the volume of the valve core seat increases or as more accessories are assembled thereon, for example, when accessories such as a solenoid valve are needed to be mounted, the size required for the valve core hole is increasingly larger, resulting in a large inner diameter, high material consumption, and high cost of the branch pipe, as well as an unattractive shape of the faucet body. Additionally, accessories such as a valve core pressing cap and a handle have to be adapted and enlarged, thus further increasing the cost. In addition, the valve core seat of the aforementioned structure only serves to connect the valve core and the water pipe in the faucet body; the valve core seat itself has no position limiting structure against the faucet body, but is positioned by the valve core fixed in the valve core hole, and this requires a structural design in the faucet body to position the valve core, thereby resulting in a complicated structure of the faucet body with great difficulty in production.

BRIEF SUMMARY OF THE INVENTION

It is an object of the present invention to provide a mounting structure of a valve core seat of a pull-out faucet, and a pull-out faucet with a sensing function comprising said mounting structure, to solve the problems in the prior art. The mounting structure can reduce the difficulty and cost of production of the faucet body, securely limit a position of the valve core seat, and attain a more stable structure of the faucet body after mounting.

To attain the above object, the present invention provides the following technical solutions:

A mounting structure of a valve core seat of a pull-out faucet, comprising a faucet body and said valve core seat; the faucet body comprises a main pipe and a branch pipe in communication with a side wall of the main pipe; a restricting portion is protruded out radially into the branch pipe from an inner diameter of an end of the branch pipe in communication with the main pipe; a boss is arranged on a side surface of the valve core seat, and a stepped surface is formed on said side surface of the valve core seat around the boss; the valve core seat is inserted into the faucet body from a lower end of the main pipe and installed into the faucet body at a height that corresponds to the branch pipe, and the boss is inserted into the branch pipe through a space enclosed by the restricting portion, and the stepped surface abuts against the restricting portion and is locked and fixed to the restricting portion.

The restricting portion is an annular flange protruded out radially into the branch pipe from the inner diameter of said end of the branch pipe.

Preferably, the mounting structure of the valve core seat of the pull-out faucet also comprises screws; the screws are inserted into the branch pipe from an outer end of the branch pipe which is an end opposite the end of the branch pipe disposed with the restricting portion, and the screws sequentially pass through the restricting portion and the stepped surface.

Preferably, screw holes are formed on the valve core seat to allow the screws to be threadedly connected, and through holes are formed on the restricting portion to allow the screws to pass through.

The mounting structure of the valve core seat of the pull-out faucet also comprises a locking ring; the locking ring is provided with internal threads; a circumferential surface of the boss is provided with external threads corresponding to the internal threads; the locking ring enters into the branch pipe from the outer end of the branch pipe and threads with the circumferential surface of the boss to press tightly against the restricting portion.

Preferably, the mounting structure of the valve core seat of the pull-out faucet further comprises a sealing ring; the sealing ring sleeves onto the circumferential surface of the boss and abuts against the stepped surface.

Preferably, a plurality of grooves are formed on an end surface of the locking ring facing away from the restricting portion.

Preferably, the plurality of grooves are arranged on a periphery of the locking ring and spaced apart from one another by an equal distance.

A pull-out faucet with a sensing function, comprising the mounting structure as described above, and further comprises a valve core, a solenoid valve, a pull-out tube, a pull-out spray head, and a sensor; a cold water inlet, a hot water inlet, and a mixed water outlet are formed on a lower surface of the valve core seat; a sensor-operated water chamber is formed on an upper surface of the valve core seat, a cold water aperture, a hot water aperture, and a mixed water aperture are formed on the boss on said side surface of the valve core seat, the cold water aperture and the hot water aperture are in communication with the cold water inlet and the hot water inlet respectively, and the mixed water aperture is in communication with the mixed water outlet through the sensor-operated water chamber; the solenoid valve is positioned in the main pipe, the solenoid valve is mounted on the upper surface of the valve core seat and closes an opening of the sensor-operated water chamber, and a valve head of the solenoid valve extends into the sensor-operated water chamber to control connection and disconnection between the mixed water aperture and the mixed water outlet; the valve core is positioned in the branch pipe, and the valve core is in communication with the cold water aperture, the hot water aperture, and the mixed water aperture of the valve core seat respectively; the pull-out tube movably passes through an upper end of the main pipe; a water inlet end of the pull-out tube is connected to the mixed water outlet of the valve core seat, and a water outlet end of the pull-out tube is connected to the pull-out spray head; the sensor is electrically connected to the solenoid valve.

Preferably, the outer end of the branch pipe is engaged with an annular valve cover, and the valve cover presses against the valve core to restrict the valve core within the branch pipe.

Preferably, a valve stem of the valve core penetrates through the valve cover and is connected to an operating handle.

Preferably, at least one positioning hole is formed on the stepped surface of the valve core seat, correspondingly, the valve core is provided with at least one positioning post engageable with said at least one positioning hole by insertion.

Preferably, the sensor is an infrared proximity sensor.

Preferably, also comprising a spring spout and a support frame; a first end of the spring spout and a first end of the support frame are both connected to the main pipe of the faucet body, and the support frame is also provided with a positioning portion for positioning the pull-out spray head; the pull-out tube movably passes through the main pipe and the spring spout.

Preferably, a restricting cylinder is fixedly engaged with the pull-out tube, a restricting sleeve is fixedly engaged at a second end of the spring spout, as the pull-out tube retracts, the restricting cylinder abuts against the restricting sleeve.

Preferably, the first end of the spring spout and the first end of the support frame are connected to the main pipe of the faucet body through a rotating pipe; one end of the rotating pipe is rotatably connected to the main pipe, and another end of the rotating pipe is fixedly connected to the first end of the spring spout and the first end of the support frame.

According to the above technical solutions, the present invention has the following technical advantages:

The present invention only requires the restricting portion to be formed in the branch pipe of the faucet body for locking and fixing the valve core seat, and the valve core seat may be mounted from the lower end of the main pipe of the faucet body. In this case, the mounting space required for the valve core seat within the branch pipe can be reduced, and the inner diameter of the branch pipe does not need to be enlarged, such that the structural design of the faucet body becomes simpler, the branch pipe is smaller, and the difficulty and cost of production are reduced. Moreover, the valve core seat may be locked and fixed against the branch pipe by providing locking and fixing means into the branch pipe through an outer end of the branch pipe, and the boss serves to position the valve core seat in a mounting process, such that mounting is more convenient, and the assembly is not easily influenced by size tolerance of accessories and is therefore more secured, and the yield rate of the assembled product is higher.

BRIEF DESCRIPTION OF THE DRAWINGS

Figure 10:
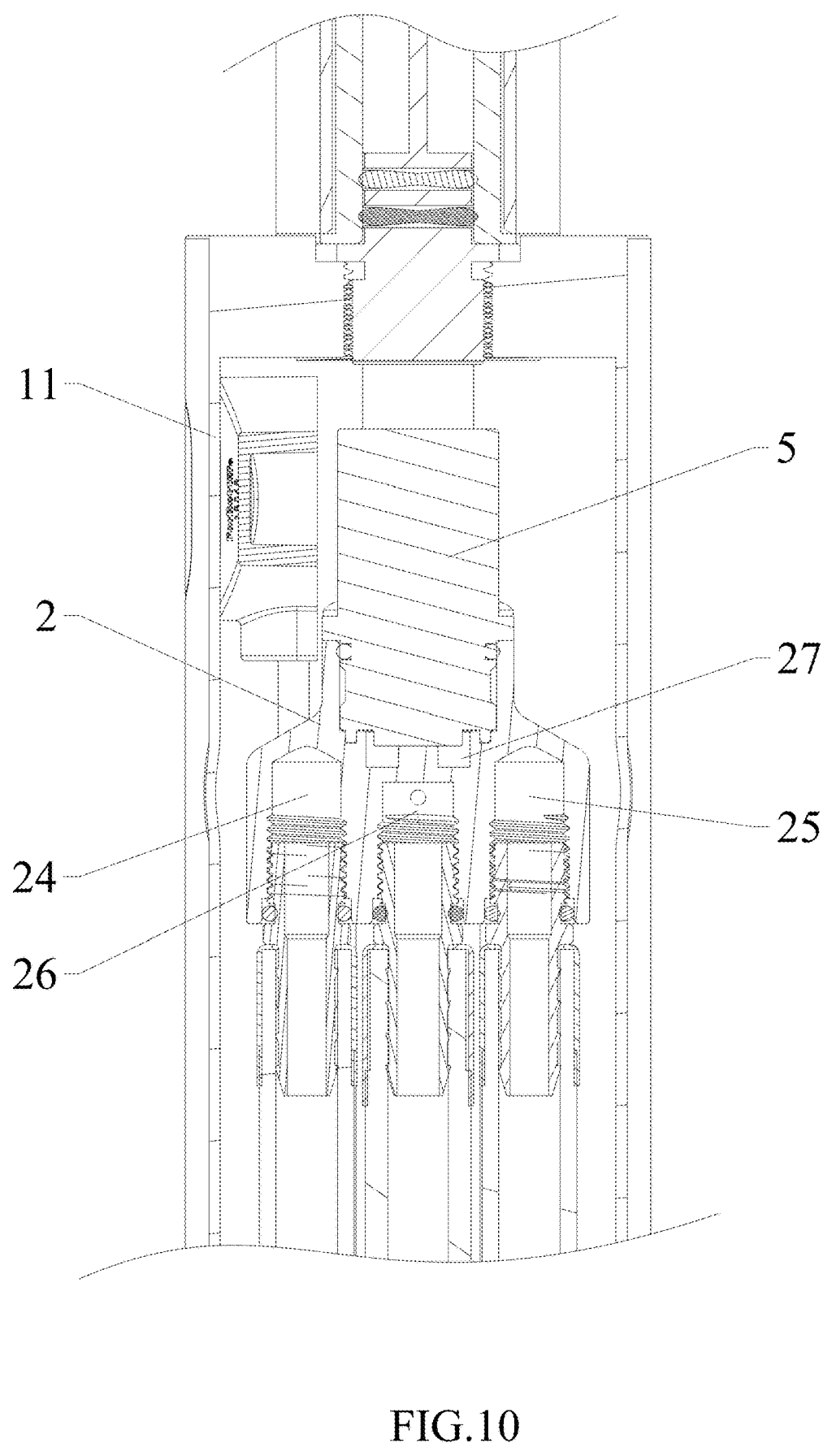

FIG. 10 is a fourth partial cross-sectional view of a specific embodiment of a pull-out faucet with a sensing function according to the present invention;

DETAILED DESCRIPTION OF THE INVENTION

Figure 1:
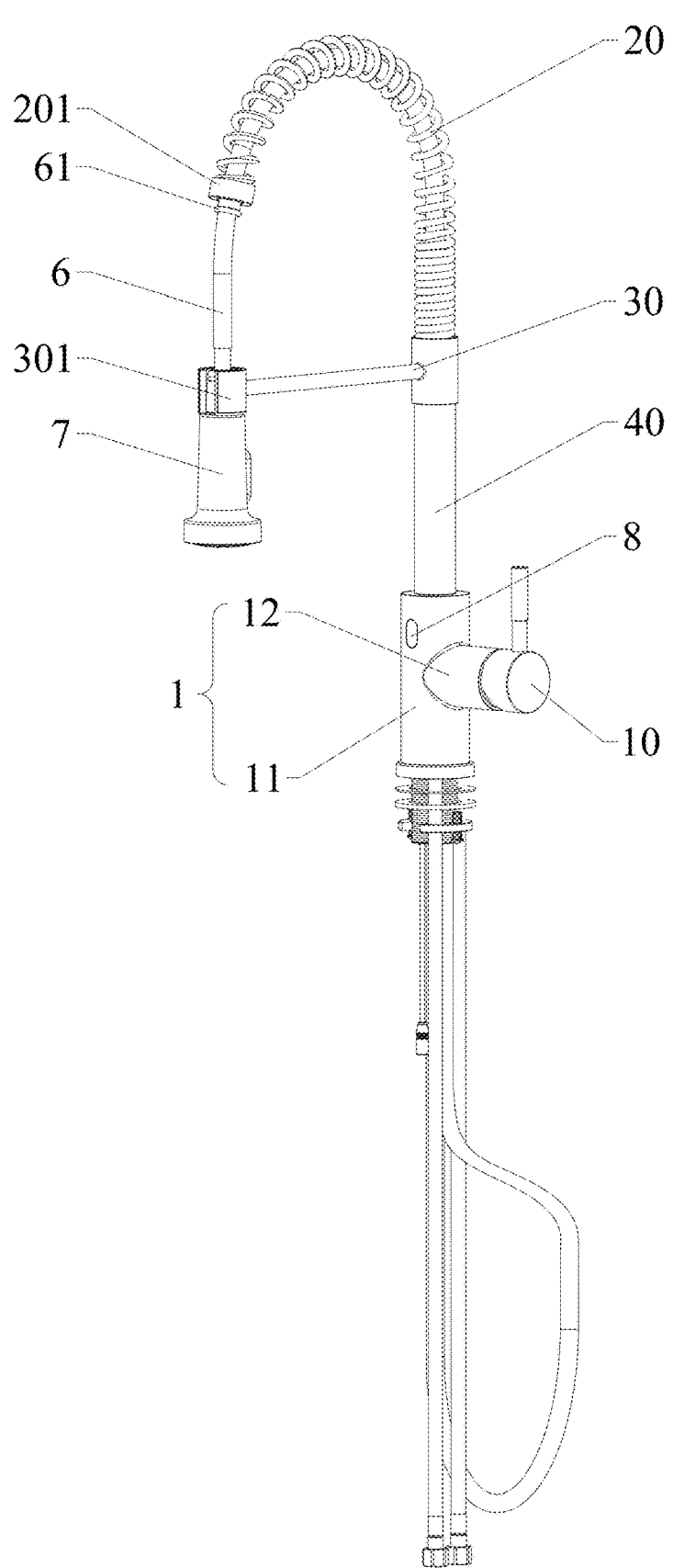
FIG. 1 is a perspective view of a specific embodiment of a pull-out faucet with a sensing function according to the present invention.
Figure 2:
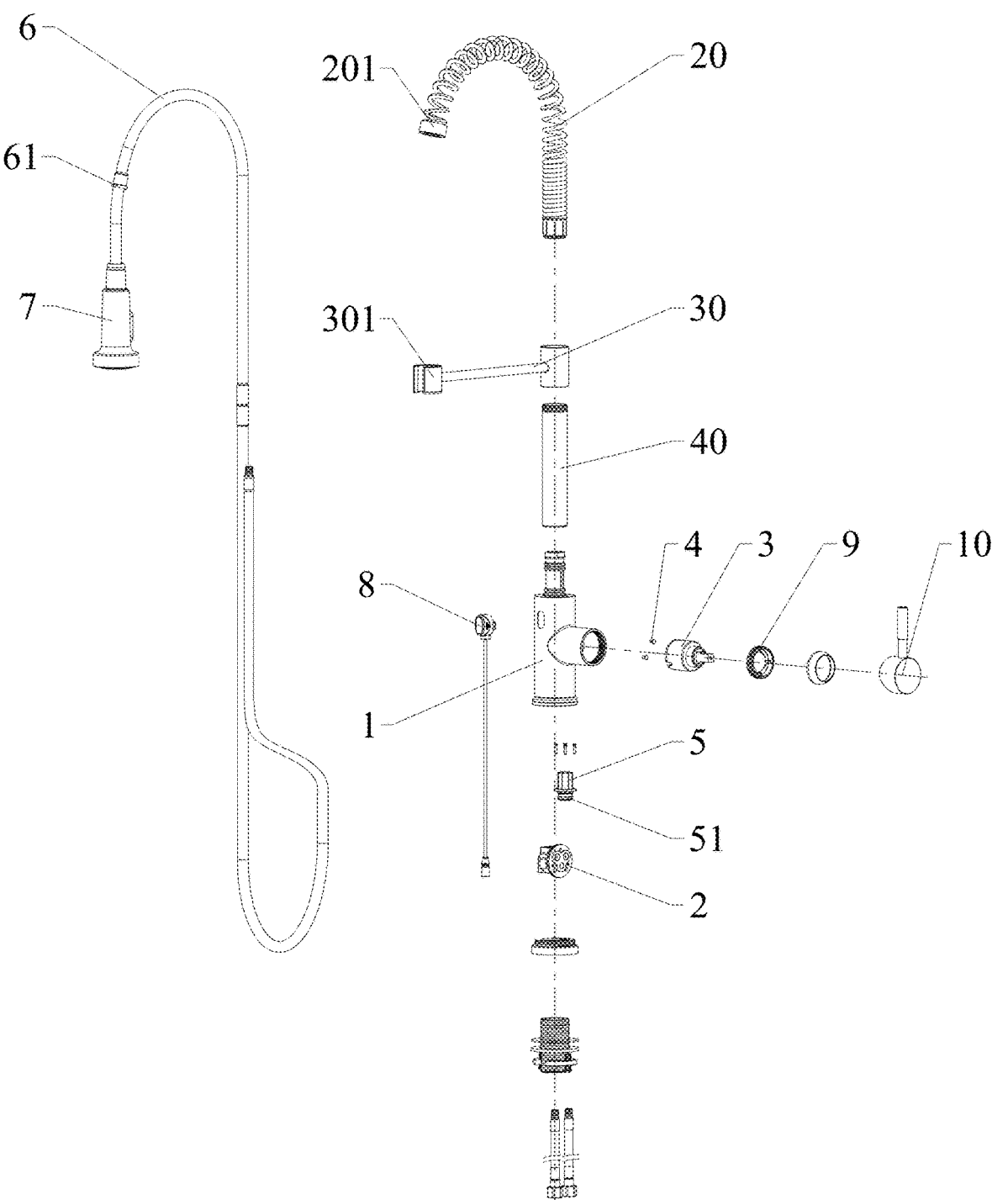
FIG. 2 is an exploded view of a specific embodiment of a pull-out faucet with a sensing function according to the present invention.
Figure 3:
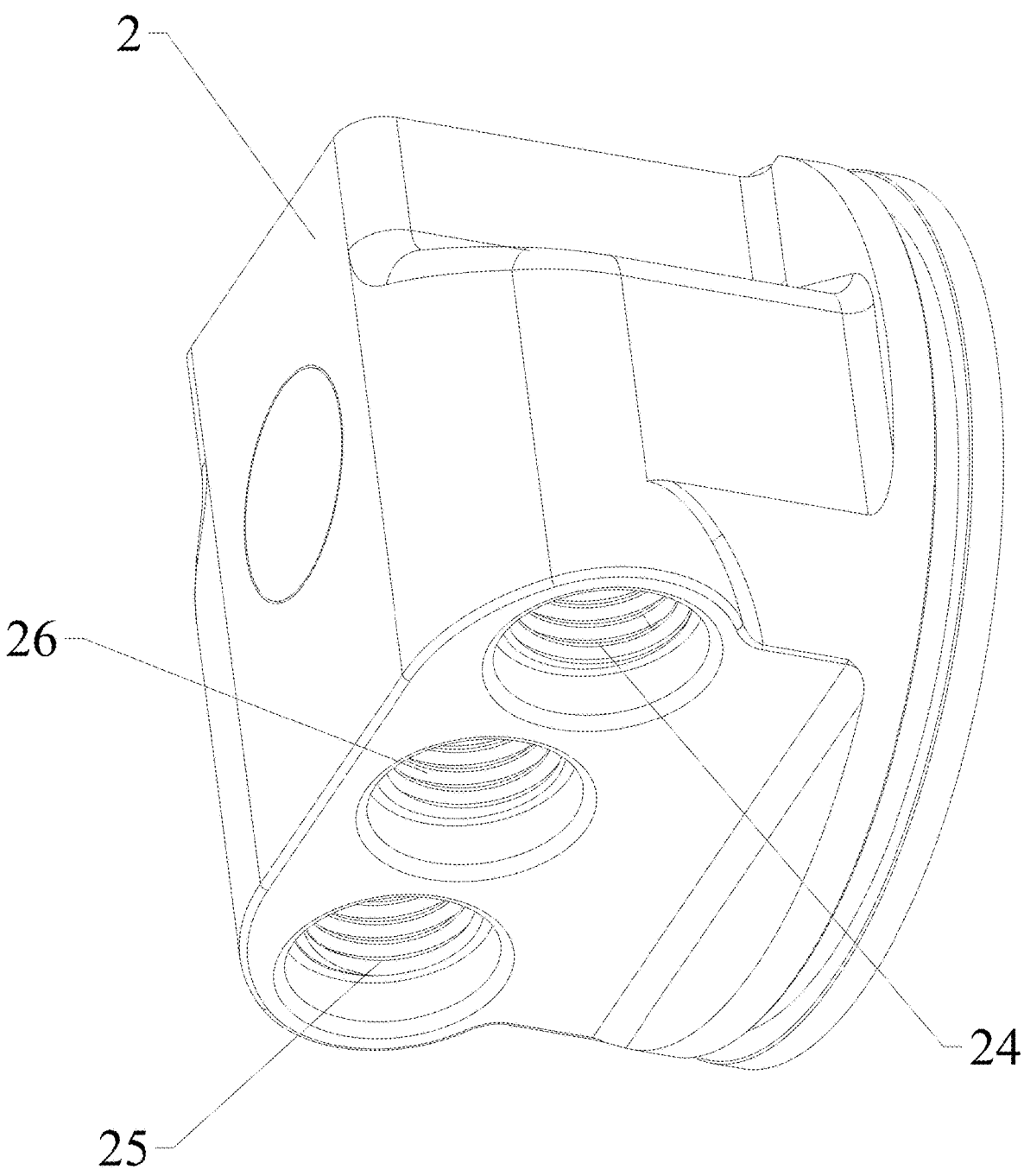
FIG. 3 is a first perspective view of a valve core seat according to a specific embodiment of the present invention.
Figure 4:
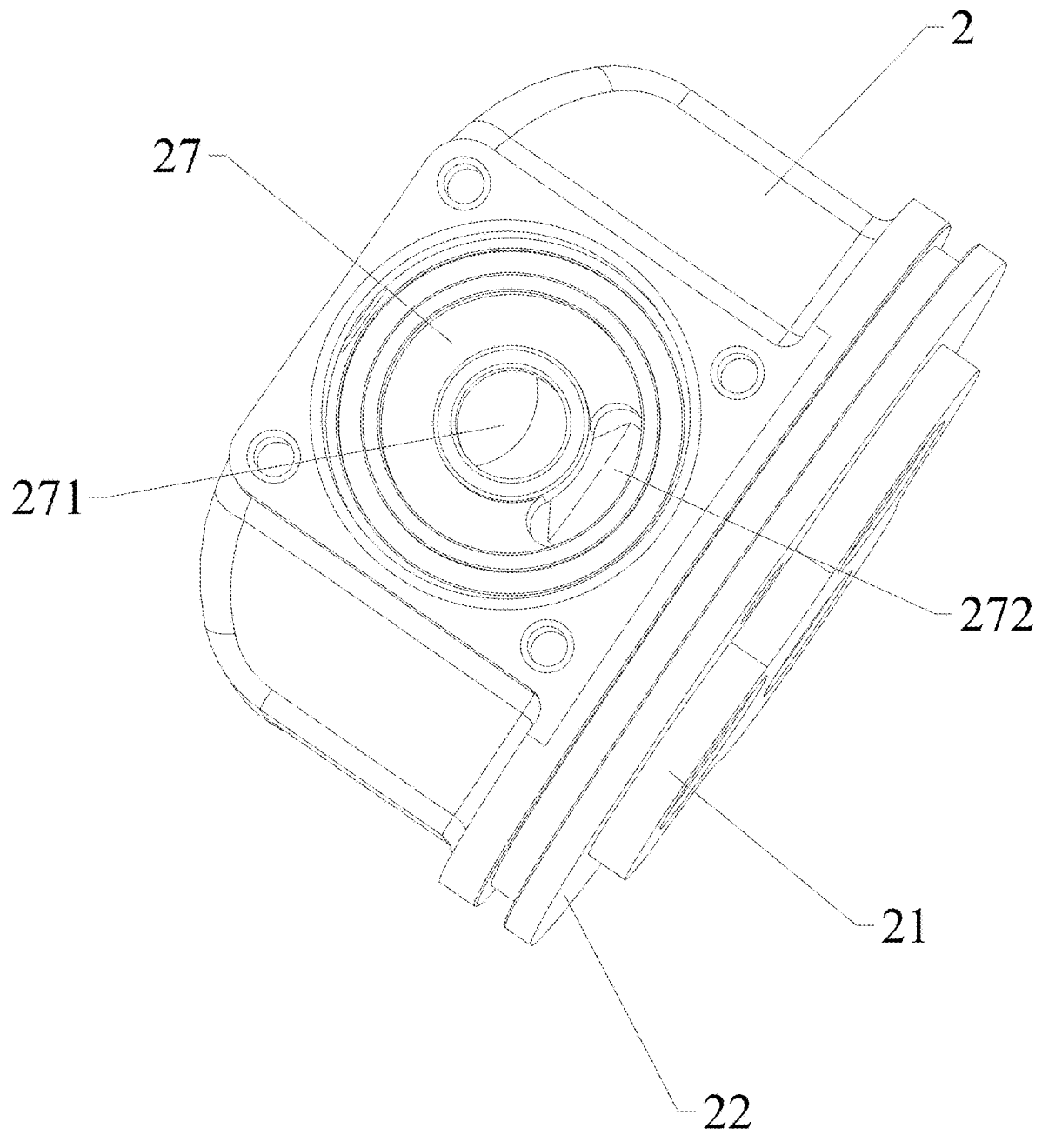
FIG. 4 is a second perspective view of the valve core seat according to a specific embodiment of the present invention.
Figure 5:
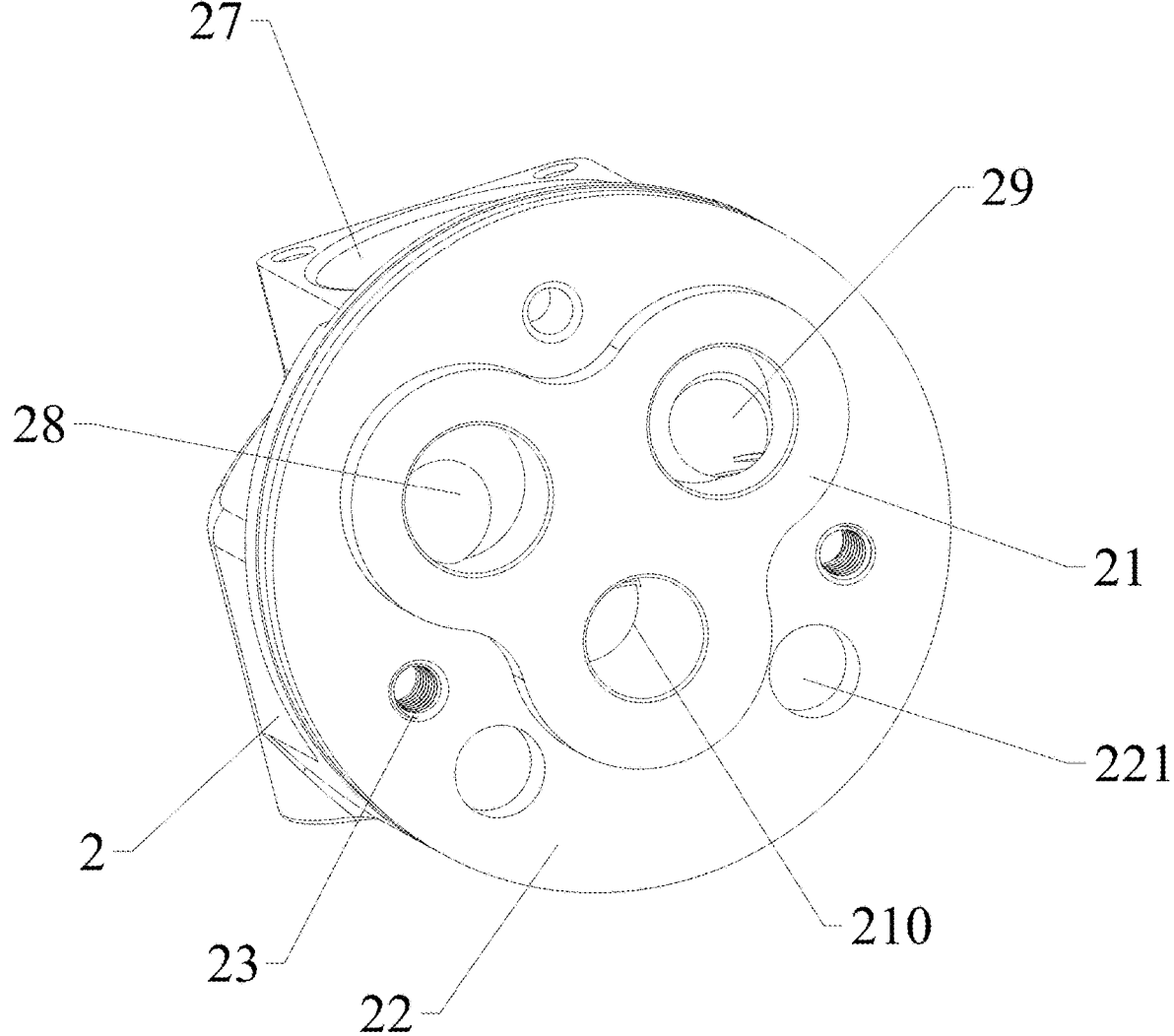
FIG. 5 is a third perspective view of the valve core seat according to a specific embodiment of the present invention.
Figure 6:
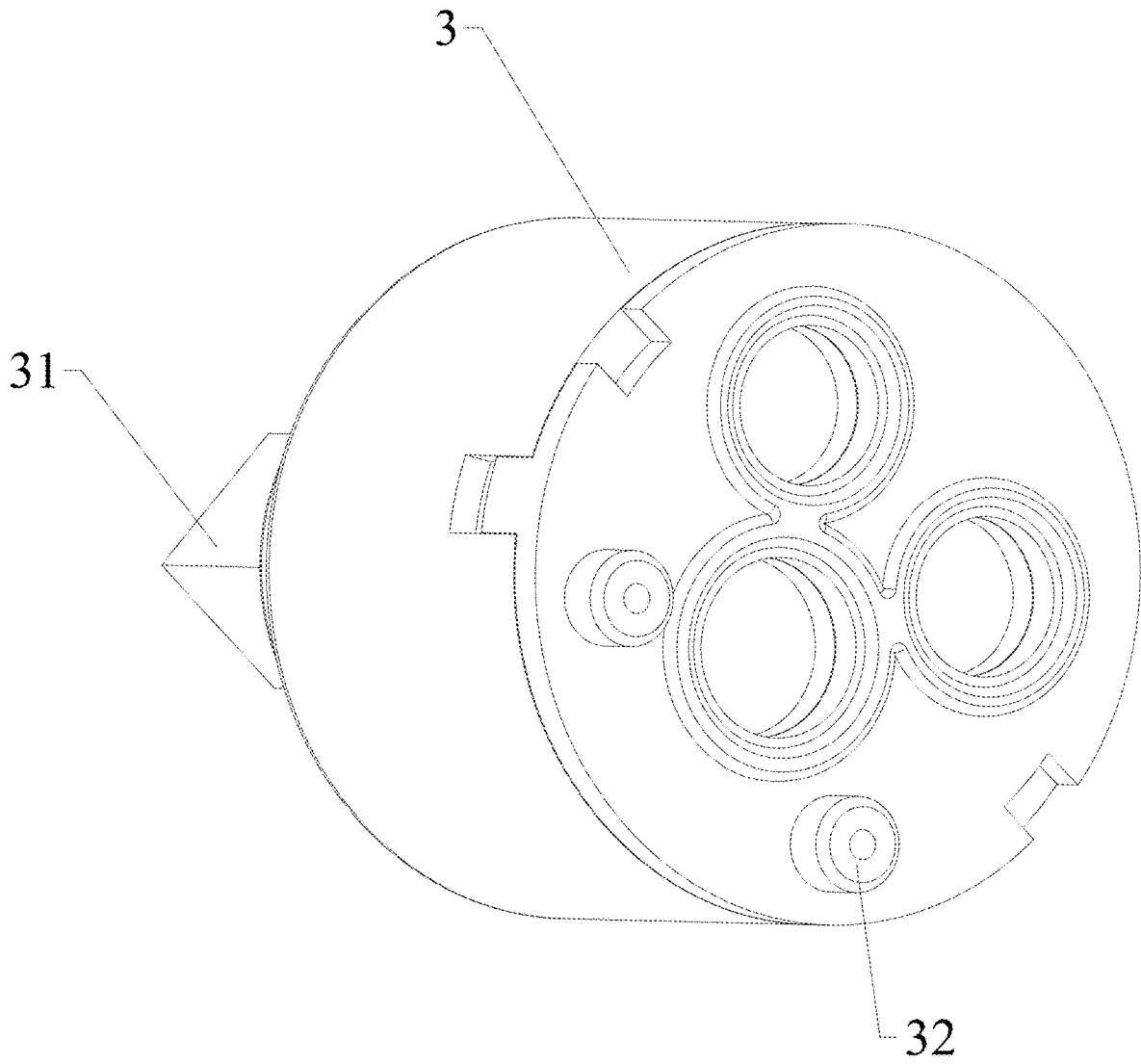
FIG. 6 is a perspective view of the valve core according to a specific embodiment of the present invention.
Figure 7:
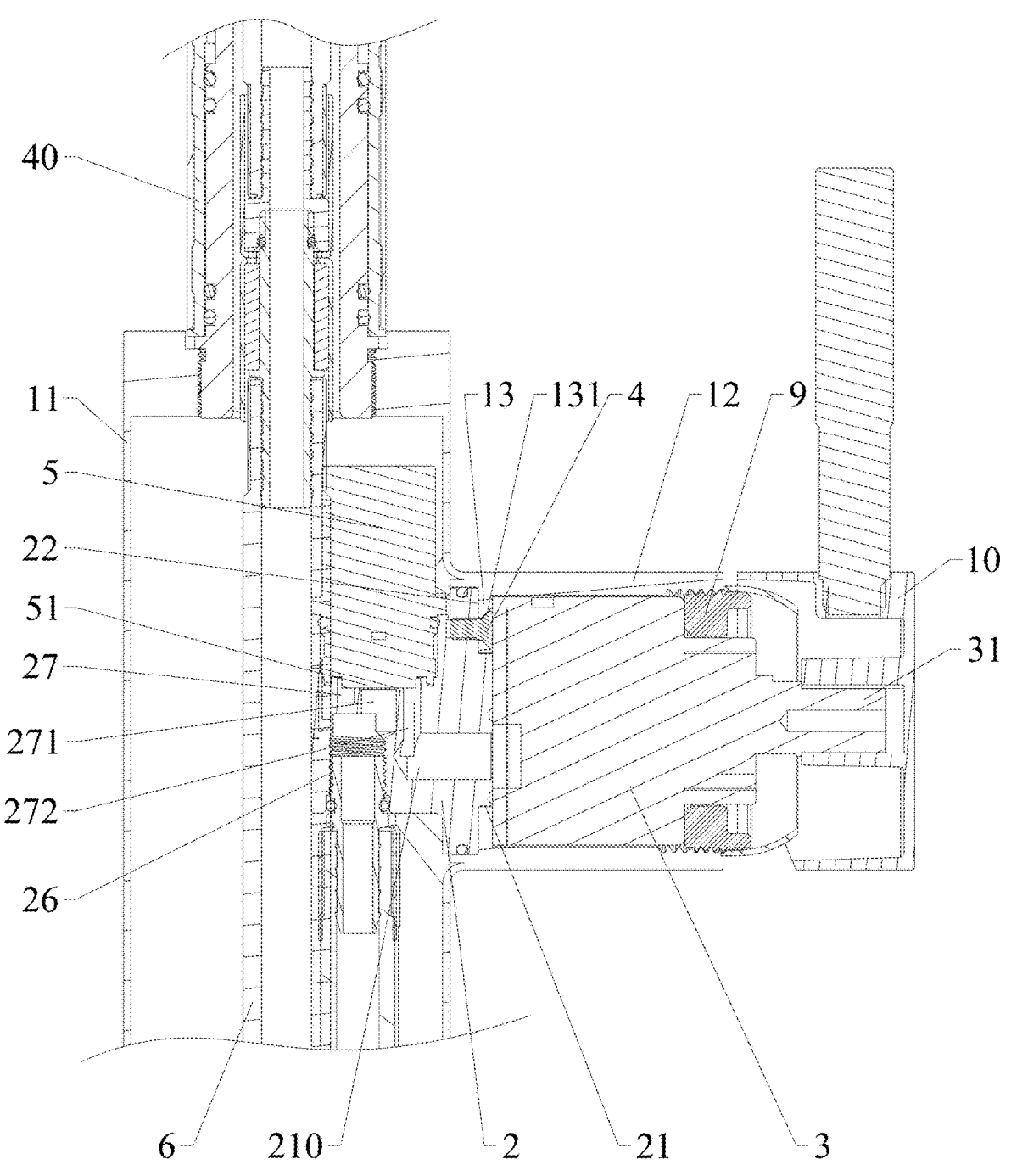
FIG. 7 is a first partial cross-sectional view of a specific embodiment of a pull-out faucet with a sensing function according to the present invention.
Figure 8:
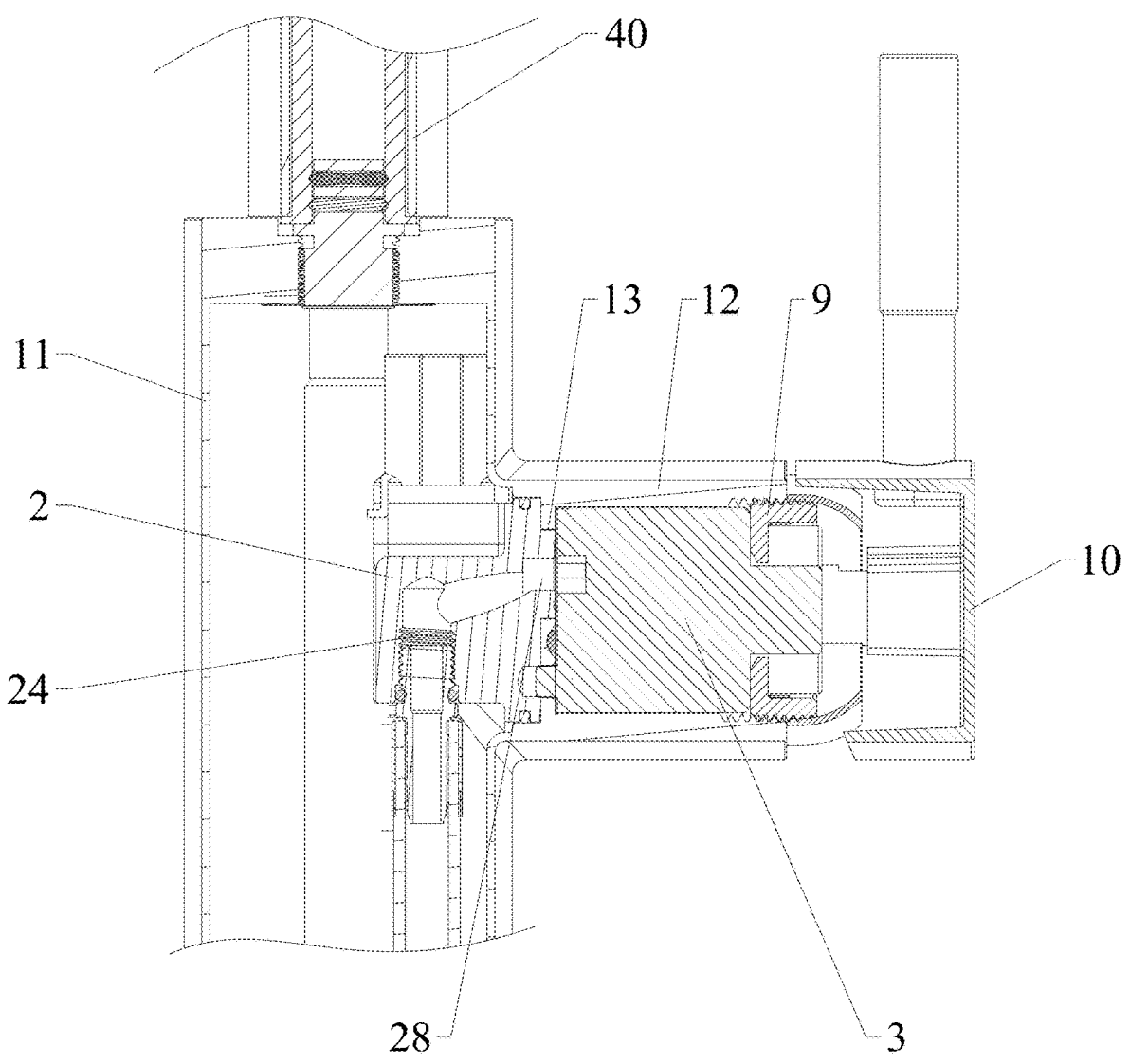
FIG. 8 is a second partial cross-sectional view of a specific embodiment of a pull-out faucet with a sensing function according to the present invention.
Figure 9:
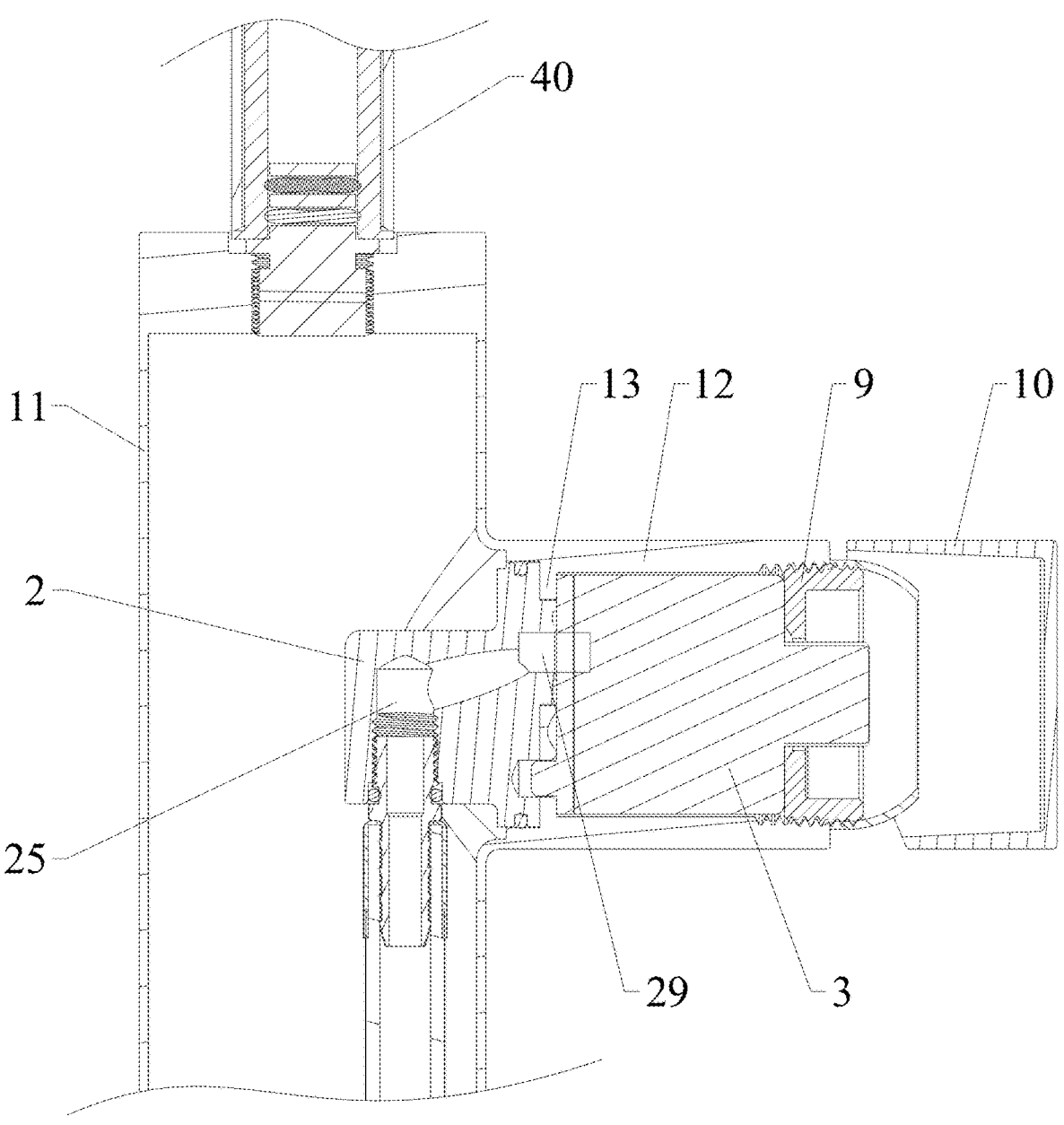
FIG. 9 is a third partial cross-sectional view of a specific embodiment of a pull-out faucet with a sensing function according to the present invention.

To further explain the technical solutions of the present invention, a detailed description of the present invention is provided below through specific embodiments.

Referring to FIGS. 1 to 13, the present invention discloses a mounting structure of a valve core seat of a pull-out faucet, comprising a faucet body 1 and said valve core seat 2;

the faucet body 1 comprises a main pipe 11 and a branch pipe 12 in communication with a side wall of the main pipe 11; a restricting portion 13 is protruded out radially into the branch pipe 12 from an inner diameter of an end of the branch pipe 12 in communication with the main pipe 11;

a boss 21 is arranged on a side surface of the valve core seat 2 engaging with a valve core 3, and a stepped surface 22 is formed on said side surface of the valve core seat 2 around the boss 21; and the valve core seat 2 is inserted into the faucet body 1 from a lower end of the main pipe 11 and installed into the faucet body 1 at a height that corresponds to the branch pipe 12, and the boss 21 is inserted into the branch pipe 12 through a space enclosed by the restricting portion 13, and the stepped surface 22 abuts against the restricting portion 13 and is locked and fixed to the restricting portion 13.

According to the above technical solutions, the present invention only requires the restricting portion 13 to be formed in the branch pipe 12 of the faucet body 1 for locking and fixing the valve core seat 2, and the valve core seat 2 may be mounted from the lower end of the main pipe 11 of the faucet body 1. In this case, the mounting space required for the valve core seat 2 within the branch pipe 12 can be reduced, and the inner diameter of the branch pipe 12 does not need to be enlarged, such that the structural design of the faucet body 1 becomes simpler, the branch pipe 12 is smaller, and the difficulty and cost of production are reduced. Moreover, the valve core seat 2 may be locked and fixed against the branch pipe 12 by providing locking and fixing means into the branch pipe 12 through an outer end of the branch pipe 12, and the boss 21 serves to position the valve core seat 2 in a mounting process, such that mounting is more convenient, and the assembly is not easily influenced by size tolerance of accessories and is therefore more secured, and the yield rate of the assembled product is higher.

The following describes the specific embodiments of the present invention.

In practical production and application of the product of the present invention, the main pipe 11 is oriented vertically and the branch pipe 12 is oriented laterally, such that the main pipe 11 and the branch pipe 12 are perpendicular to each other.

The restricting portion 13 is an annular flange protruded out radially from the inner diameter of said end of the branch pipe 12. The restricting portion 13 configured with such annular shape enables a larger force-bearing surface and higher structural strength when the stepped surface 22 of the valve core seat 2 is in contact with and then being locked and fixed with the restricting portion 13, in other words, when screws 4 or a locking ring 50 as will be described below are used to lock and fix the stepped surface and the restricting portion, a more secured structure can be achieved.

Referring to FIGS. 2 to 7, in one embodiment of mounting the valve core seat 2, screws 4 are used; the screws 4 are inserted into the branch pipe 12 from an outer end of the branch pipe 12 which is an end opposite the end of the branch pipe disposed with the restricting portion, and the screws 4 sequentially pass through the restricting portion 13 and the stepped surface 22, thereby locking and fixing the valve core seat 2 against the restricting portion 13.

Further, screw holes 23 are formed on the valve core seat 2 to allow the screws 4 to be threadedly connected, and through holes 131 are formed on the restricting portion 13 to allow the screws 4 to pass through. Generally, at least two screws 4 are used to lock and fix the valve core seat 2 more securely, such that the valve core seat 2 is not easy to wobble.

According to another embodiment of the present invention, a pull-out faucet with a sensing function is provided, comprising the mounting structure as described above, and further comprises a valve core 3, a solenoid valve 5, a pull-out tube 6, a pull-out spray head 7, and a sensor 8; a cold water inlet 24, a hot water inlet 25, and a mixed water outlet 26 are formed on a lower surface of the valve core seat 2; a sensor-operated water chamber 27 is formed on an upper surface of the valve core seat 2, a cold water aperture 28, a hot water aperture 29, and a mixed water aperture 210 are formed on the boss 21 on said side surface of the valve core seat 2, the cold water aperture 28 and the hot water aperture 29 are in communication with the cold water inlet 24 and the hot water inlet 25 respectively, and the mixed water aperture 210 is in communication with the mixed water outlet 26 through the sensor-operated water chamber 27; the solenoid valve 5 is positioned in the main pipe 11, the solenoid valve 5 is mounted on the upper surface of the valve core seat 2 and closes an opening of the sensor-operated water chamber 27, and a valve head 51 of the solenoid valve 5 extends into the sensor-operated water chamber 27 to control connection and disconnection between the mixed water aperture 210 and the mixed water outlet 26; the valve core 3 is positioned in the branch pipe 12, and a cold water inlet end, a hot water inlet end, and a mixed water outlet end of the valve core 3 connect and communicate with the cold water aperture 28, the hot water aperture 29, and the mixed water aperture 210 of the valve core seat 2 respectively; the pull-out tube 6 movably passes through an upper end of the main pipe 11; a water inlet end of the pull-out tube 6 is connected to the mixed water outlet 26 of the valve core seat 2, and a water outlet end of the pull-out tube 6 is connected to the pull-out spray head 7; the sensor 8 is electrically connected to the solenoid valve 5, and the sensor 8 is used for controlling operation of the solenoid valve 5, thereby controlling the connection and disconnection between the mixed water aperture 210 and the mixed water outlet 26 and thus achieving control of water discharge from the pull-out spray head 7.

The structures mentioned in the previous paragraphs can be mounted as follows: the valve core seat 2 and the solenoid valve 5 are both positioned in the main pipe 11 of the faucet body 1, and the valve core seat 2 is locked and fixed to the restricting portion 13 of the branch pipe 12 through the screws 4. According to a specific mounting process, the solenoid valve 5 may be mounted on the valve core seat 2 first to form an assembly, and the assembly comprising the solenoid valve 5 and the valve core seat 2 is then inserted into the main pipe 11 from the lower end of the main pipe 11 and until the valve core seat 2 reaches a height corresponding to the branch pipe 12, and finally, the screws 4 are inserted into the branch pipe 12 from the outer end of the branch pipe 12 of the faucet body 1, and the valve core seat 2 is then locked and fixed to the restricting portion 13 through the screws 4. From the above description, the technical effects of the described structure are as follows: When assembling a faucet, accessories such as the valve core seat 2 and the solenoid valve 5 are no longer required to be mounted from the branch pipe 12, but are directly mounted from the lower end of the main pipe 11, such that the mounting space required in the branch pipe 12 for mounting the valve core seat 2 and the solenoid valve 5 can be minimized, and the inner diameter of the branch pipe 12 is not required to be enlarged, which facilitates the reduction in material consumption and cost of the branch pipe 12. As a result, the size of the faucet body 1 of the present invention can be as small as that of ordinary pull-out faucet without accessories such as the solenoid valve 5, thus making it more in line with the aesthetics concept and consumption demands of the consumers. In addition, the cold water inlet 24, the hot water inlet 25, and the mixed water outlet 26 of the valve core seat 2 are all facing downwardly to reduce the occupation of a lateral space inside the main pipe 11 of the faucet body 1 when the cold water inlet 24 and the hot water inlet 25 are connected to an external water source through pipelines; also, mounting the solenoid valve 5 on the upper surface of the valve core seat 2 can also reduce the occupation of the lateral space inside the main pipe 11 of the faucet body 1.

According to an embodiment of the present invention, the outer end of the branch pipe 12 is engaged with an annular valve cover 9, and the valve cover 9 presses against the valve core 3 to restrict the valve core 3 within the branch pipe 12, such that the valve core 3 is prevented from falling off to ensure that the valve core 3 is firmly connected to the valve core seat 2; the valve cover 9 may be in threaded connection to an inner wall of the branch pipe 12; the cold water inlet end, the hot water inlet end, and the mixed water outlet end of the valve core 3 may be provided with sealing gaskets respectively, such that the cold water inlet end, the hot water inlet end, and the mixed water outlet end of the valve core 3 are sealed with the cold water aperture 28, the hot water aperture 29, and the mixed water aperture 210 of the valve core seat 2 respectively; a valve stem 31 of the valve core 3 penetrates through the valve cover 9 and is connected to an operating handle 10 for a user to operate the valve core 3; at least one positioning hole 221 is formed on the stepped surface 22 of the valve core seat 2, correspondingly, the valve core 3 is provided with at least one positioning post 32 engageable with said at least one positioning hole 221 by insertion, and the engagement between said at least one positioning post 32 and said at least one positioning hole 221 enables the valve core 3 and the valve core seat 2 to be accurately aligned and connected, and ensuring that the mounting direction of the valve core 3 is accurate.

According to an embodiment of the present invention, the valve core seat 2 may be manufactured by injection molding; the cold water inlet 24 intersects and communicates with the cold water aperture 28, and the hot water inlet 25 intersects and communicates with the hot water aperture 29; a sensor-operated outlet 271 and a sensor-operated inlet 272 are formed on a bottom of the sensor-operated water chamber 27, and the sensor-operated outlet 271 and the sensor-operated inlet 272 communicate with the mixed water outlet 26 and the mixed water aperture 210 respectively; the sensor-operated outlet 271 and the mixed water outlet 26 may be arranged in parallel and staggered, and the sensor-operated inlet 272 intersects and communicates with the mixed water aperture 210; the valve head 51 of the solenoid valve 5 directly faces towards the sensor-operated outlet 271 to removably block the sensor-operated outlet 271, thereby controlling the connection and disconnection between the mixed water aperture 210 and the mixed water outlet 26; the solenoid valve 5 may be locked and fixed with the valve core seat 2 by screws.

According to an embodiment of the present invention, the sensor 8 may be mounted in the main pipe 11 of the faucet body 1, and the sensor 8 may be an infrared proximity sensor.

According to an embodiment of the present invention, a spring spout 20 and a support frame 30 are further provided; a first end of the spring spout 20 and a first end of the support frame 30 are both connected to the main pipe 11 of the faucet body 1, and the support frame 30 is also provided with a positioning portion 301 for positioning the pull-out spray head 7; the pull-out tube 6 movably passes through the main pipe 11 and the spring spout 20. In this case, the product of the present invention is actually a spring pull-out faucet. The spring spout 20 may be bent and deformed, such that the movable range of the pull-out spray head 7 is large; the positioning portion 301 of the support frame 30 is used for positioning the pull-out spray head 7, such that the pull-out spray head 7 can be stably placed, the positioning portion 301 may be a C-type elastic clip, and the positioning portion 301 may be arranged at a second end of the support frame 30.

Further, a restricting cylinder 61 is fixedly engaged with the pull-out tube 6, a restricting sleeve 201 is fixedly engaged at a second end of the spring spout 20, as the pull-out tube 6 retracts, the restricting cylinder 61 abuts against the restricting sleeve 201 to limit retraction of the pull-out tube 6, which can prevent the pull-out tube 6 from retracting excessively. Excessive retraction of the pull-out tube 6 refers to the situation where, upon retraction, the pull-out spray head 7 is not held by the support frame 30, causing the pull-out spray head 7 to be brought too close to the second end of the spring spout 20 would there not be any restricting cylinder 61 and restricting sleeve 201, thereby resulting in the excessive retraction of the pull-out tube 6. The restricting sleeve 201 may be engaged with or threaded with the second end of the spring spout 20, and thus the connection between the restricting sleeve 201 and the spring spout 20 is simple and stable.

Additionally, the first end of the spring spout 20 and the first end of the support frame 30 are connected to the main pipe 11 of the faucet body 1 through a rotating pipe 40; one end of the rotating pipe 40 is rotatably connected to the main pipe 11, and another end of the rotating pipe 40 is fixedly connected to the first end of the spring spout 20 and the first end of the support frame 30; in this case, the spring spout 20, the support frame 30, and the rotating pipe 40 can rotate relative to the faucet body 1, thereby facilitating the use of the faucet by the user.

Figure 11:
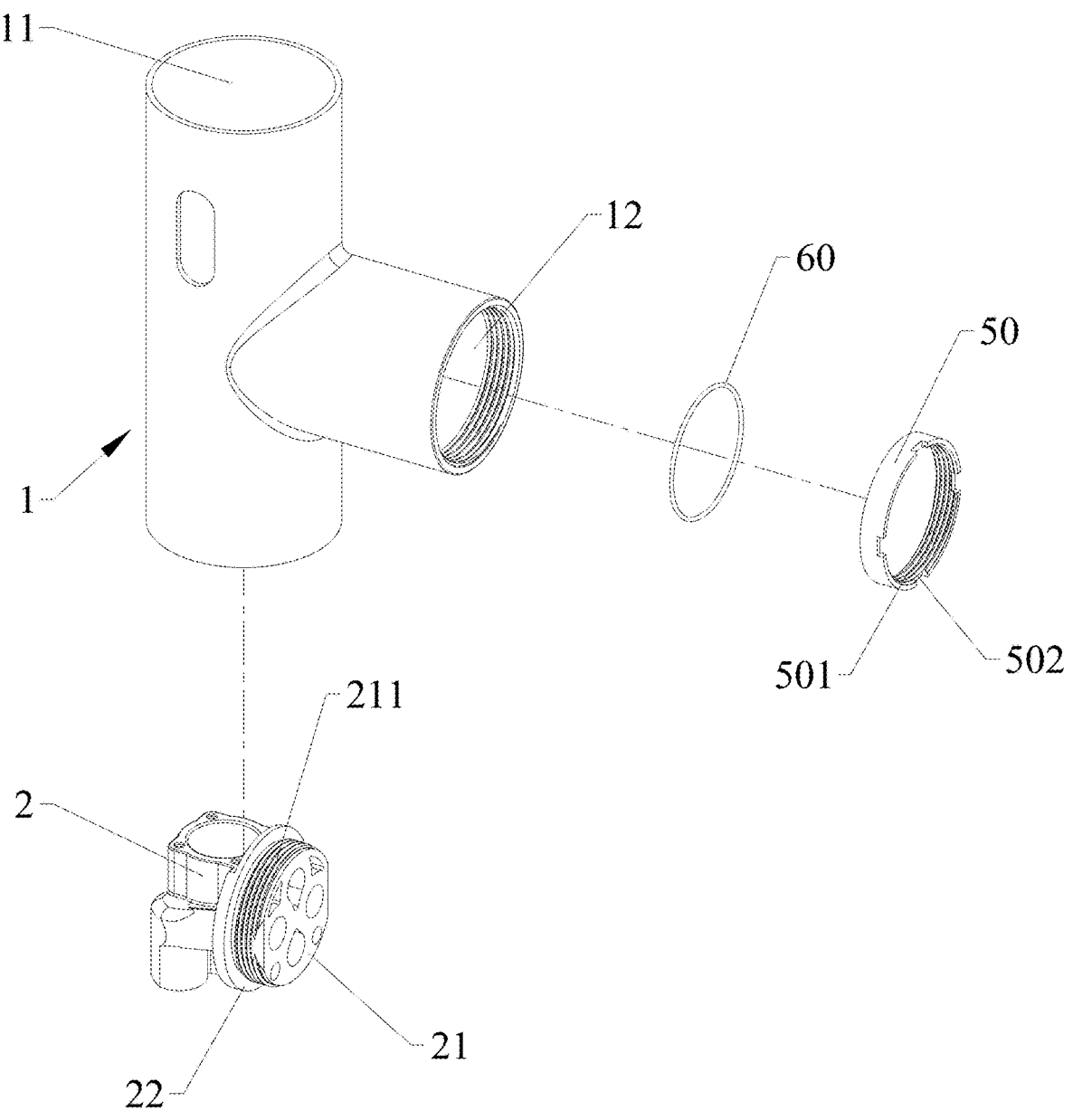
FIG. 11 is an exploded view of another mounting method for the valve core seat of according to a specific embodiment of the present invention.
Figure 12:
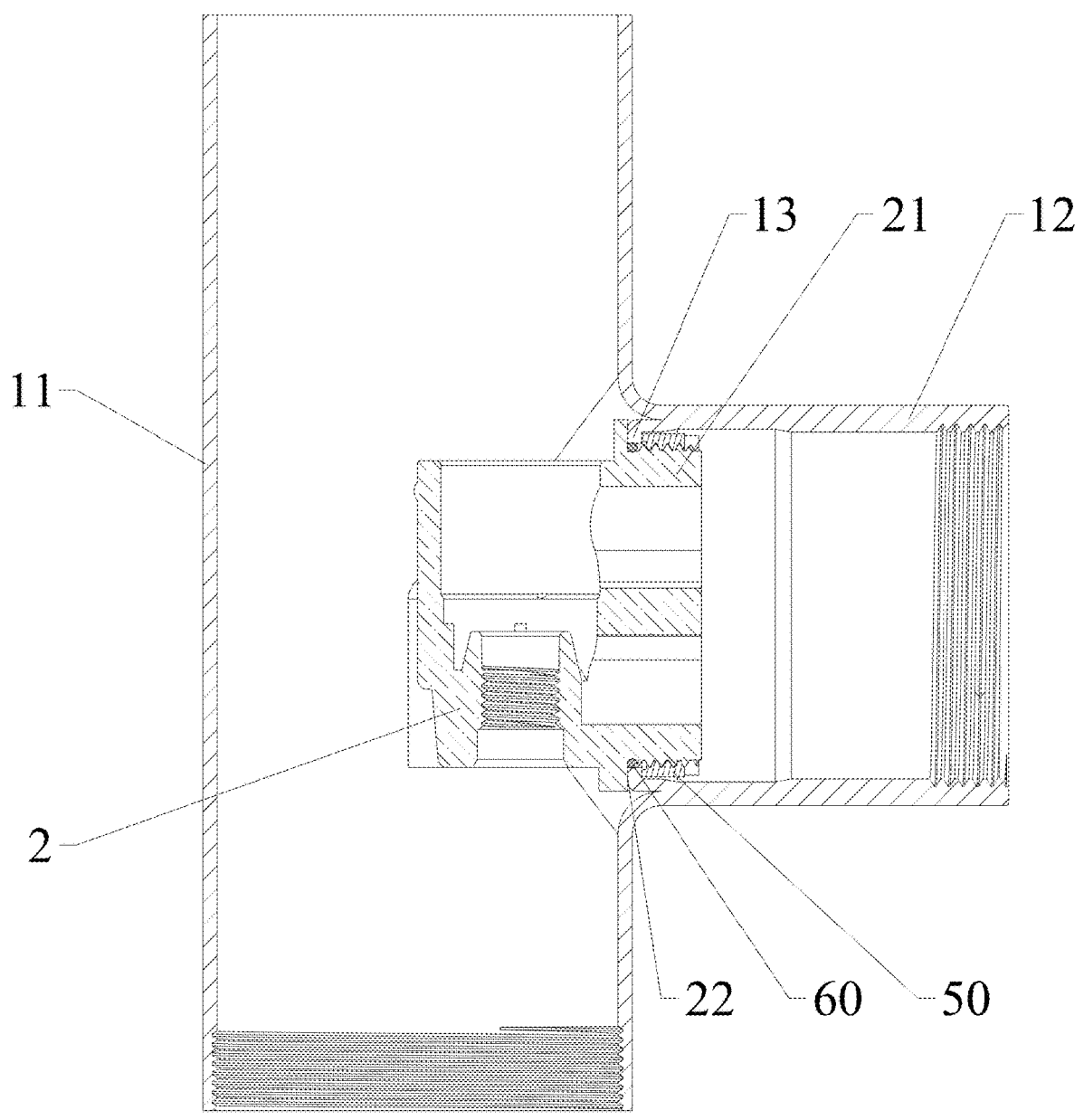
FIG. 12 is a cross-sectional view of said another mounting method for the valve core seat according to a specific embodiment of the present invention.
Figure 13:
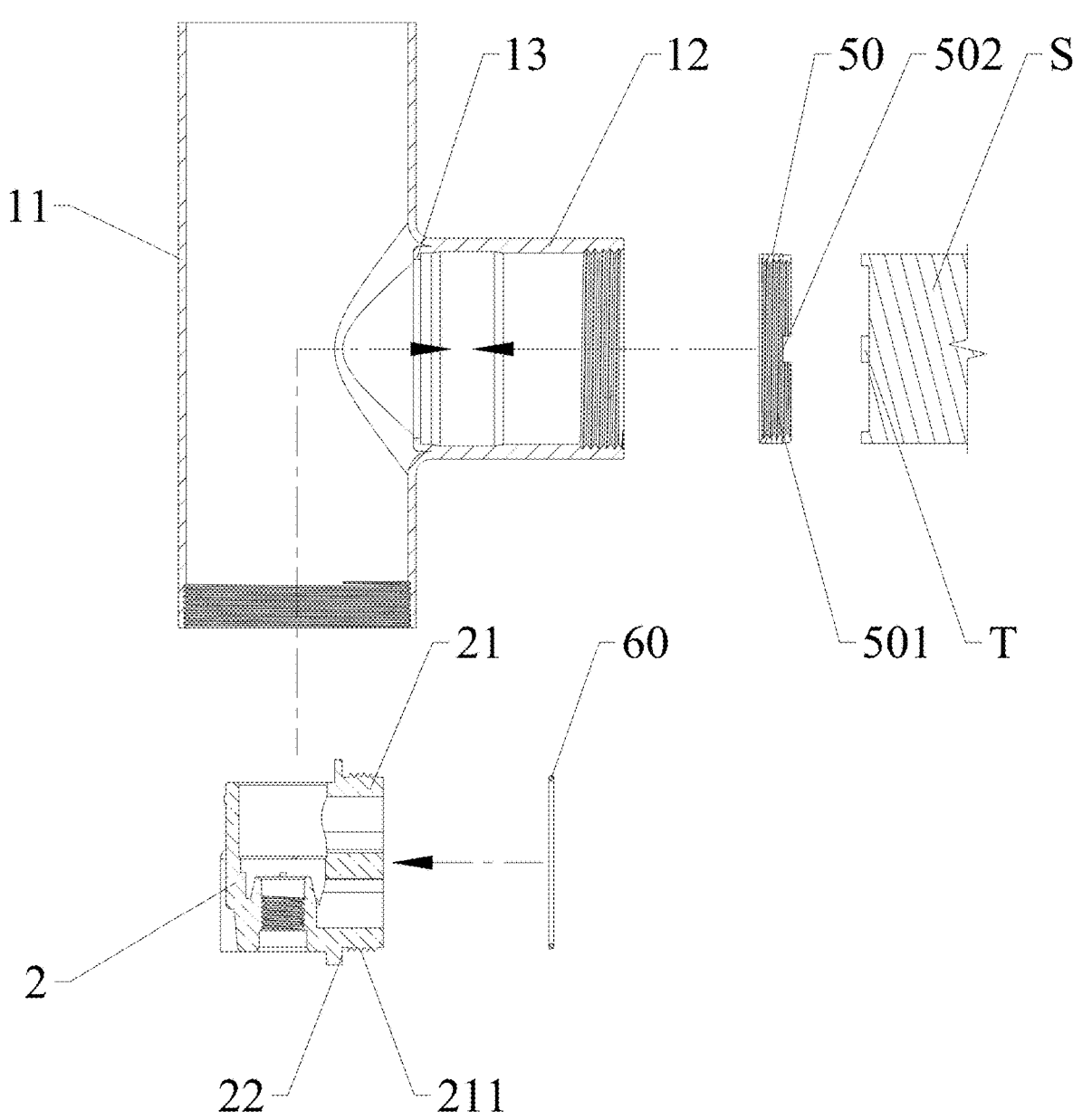
FIG. 13 is a schematic view illustrating the mounting process of said another mounting method for the valve core seat according to a specific embodiment of the present invention.

Referring to FIGS. 11 to 13, in another mounting method of the valve core seat 2, a locking ring 50 is provided; the locking ring 50 is provided with internal threads 501; a circumferential surface of the boss 21 is provided with external threads 211 corresponding to the internal threads 501; the locking ring 50 enters into the branch pipe 12 from the outer end of the branch pipe 12 and then threads with the circumferential surface of the boss 21 to press tightly against the restricting portion 13, such that the restricting portion 13 is tightly clamped by the valve core seat 2 and the locking ring 50. By tightening the locking ring 50 against the restricting portion 13 through threaded connection, the restricting portion 13 are clamped tightly by the stepped surface 22 of the valve core seat 2 and the locking ring 50, and thus the valve core seat 2 can be mounted and fixed; the threaded connection method makes assembly simpler, requiring only the axial alignment of the boss 21 and the locking ring 50.

Further, the present invention further comprises a sealing ring 60; the sealing ring 60 sleeves onto the circumferential surface of the boss 21 and abuts against the stepped surface 22, such that after the valve core seat 2 is mounted with respect to the restricting portion 13, the sealing ring 60 can be tightly clamped between the circumferential surface of the boss 21 and the restricting portion 13, thereby serving a sealing function. In this case, when the valve core experiences abnormal water leakage, water will not leak to the main pipe 11, thereby preventing water from leaking to the countertop where the faucet body is assembled.

Additionally, the restricting portion 13 is formed on the branch pipe 12 by existing processes such as stainless steel welding, zinc alloy die-casting, and copper stamping, or may be integrally formed with the faucet body 1.

Further, a plurality of grooves 502 are formed on an end surface of the locking ring 50 facing away from the restricting portion 13, so that a cylindrical tool S with projections T have a shape that corresponds to that of the grooves 502 can be used where the projections T can be engaged with the grooves 502, such that the locking ring 50 is driven to rotate when the tool S is rotated, thus allowing for rotation of the locking ring 50 so as to tighten or loosen the locking ring 50 with respect to the boss 21. Referring to FIG. 13, a mounting process of the aforementioned structures is as follows: Firstly, sleeve the sealing ring 60 onto the boss 21 where the sealing ring 60 also abuts against the stepped surface 22; then the valve core seat 2 is inserted into the main pipe from the bottom of the main pipe 11 until the valve core seat 2 reaches at a height corresponding to that of the branch pipe 12, and next the locking ring 50 is placed at an end of a corresponding cylindrical tool S and the cylindrical tool S carrying the locking ring 50 is inserted from the outer end of the branch pipe 12 until the locking ring 50 abuts against the boss 21 of the valve core seat 2; rotate the cylindrical tool S to drive the locking ring 50 to rotate until the locking ring is tightened, and then the cylindrical tool S is withdrawn, thereby completing the mounting of the valve core seat 2. The grooves 502 may be arranged on a periphery of the locking ring 50 and spaced apart from one another by an equal distance.

The above embodiments and illustrations are not intended to limit the form and style of the product of the present invention. Any appropriate variations or modifications made by those of ordinary skills in the art within the scope of the present invention shall be considered as falling within the scope of the patent.

What is claimed is:

1. A pull-out faucet with a sensing function, comprising a mounting structure; wherein the mounting structure comprises:

a faucet body and a valve core seat;

the faucet body comprises a main pipe and a branch pipe in communication with a side wall of the main pipe; a restricting portion is protruded out radially into the branch pipe from an inner diameter of an end of the branch pipe in communication with the main pipe;

a boss is arranged on a side surface of the valve core seat, and a stepped surface is formed on said side surface of the valve core seat around the boss;

the valve core seat is inserted into the faucet body from a lower end of the main pipe and installed into the faucet body at a height that corresponds to the branch pipe, and the boss is inserted into the branch pipe through a space enclosed by the restricting portion, and the stepped surface abuts against the restricting portion and is locked and fixed to the restricting portion, the pull-out faucet further comprises a valve core, a solenoid valve, a pull-out tube, a pull-out spray head, and a sensor; a cold water inlet, a hot water inlet, and a mixed water outlet are formed on a lower surface of the valve core seat; a sensor-operated water chamber is formed on an upper surface of the valve core seat, a cold water aperture, a hot water aperture, and a mixed water aperture are formed on the boss on said side surface of the valve core seat, the cold water aperture and the hot water aperture are in communication with the cold water inlet and the hot water inlet respectively, and the mixed water aperture is in communication with the mixed water outlet through the sensor-operated water chamber; the solenoid valve is positioned in the main pipe, the solenoid valve is mounted on the upper surface of the valve core seat and closes an opening of the sensor-operated water chamber, and a valve head of the solenoid valve extends into the sensor-operated water chamber to control connection and disconnection between the mixed water aperture and the mixed water outlet; the valve core is positioned in the branch pipe, and the valve core is in communication with the cold water aperture, the hot water aperture, and the mixed water aperture of the valve core seat respectively; the pull-out tube movably passes through an upper end of the main pipe; a water inlet end of the pull-out tube is connected to the mixed water outlet of the valve core seat, and a water outlet end of the pull-out tube is connected to the pull-out spray head; the sensor is electrically connected to the solenoid valve.

2. The pull-out faucet of claim 1, wherein an outer end of the branch pipe is engaged with a valve cover which is annular, and the valve cover presses against the valve core to restrict the valve core within the branch pipe.

3. The pull-out faucet of claim 2, wherein a valve stem of the valve core penetrates through the valve cover and is connected to an operating handle.

4. The pull-out faucet of claim 1, wherein at least one positioning hole is formed on the stepped surface of the valve core seat, correspondingly, the valve core is provided with at least one positioning post engageable with said at least one positioning hole by insertion.

5. The pull-out faucet of claim 1, the sensor is an infrared proximity sensor.

6. The pull-out faucet of claim 1, also comprising a spring spout and a support frame; a first end of the spring spout and a first end of the support frame are both connected to the main pipe of the faucet body, and the support frame is also provided with a positioning portion for positioning the pull-out spray head; the pull-out tube movably passes through the main pipe and the spring spout.

7. The pull-out faucet of claim 6, a restricting cylinder is fixedly engaged with the pull-out tube, a restricting sleeve is fixedly engaged at a second end of the spring spout, as the pull-out tube retracts, the restricting cylinder abuts against the restricting sleeve.

8. The pull-out faucet of claim 6, the first end of the spring spout and the first end of the support frame are connected to the main pipe of the faucet body through a rotating pipe; one end of the rotating pipe is rotatably connected to the main pipe, and another end of the rotating pipe is fixedly connected to the first end of the spring spout and the first end of the support frame.

9. The pull-out faucet of claim 1, wherein the restricting portion is an annular flange protruded out radially into the branch pipe from the inner diameter of said end of the branch pipe.

10. The pull-out faucet of claim 1, further comprising screws; the screws are inserted into the branch pipe from an outer end of the branch pipe which is an end opposite the end of the branch pipe in communication with the main pipe, and the screws sequentially pass through the restricting portion and the stepped surface.

11. The pull-out faucet of claim 10, wherein screw holes are formed on the valve core seat to allow the screws to be threadedly connected, and through holes are formed on the restricting portion to allow the screws to pass through.

12. The pull-out faucet of claim 1, also comprising a locking ring; the locking ring is provided with internal threads; a circumferential surface of the boss is provided with external threads corresponding to the internal threads; the locking ring enters into the branch pipe from the outer end of the branch pipe and threads with the circumferential surface of the boss to press tightly against the restricting portion.

13. The pull-out faucet of claim 12, further comprising a sealing ring; the sealing ring sleeves onto the circumferential surface of the boss and abuts against the stepped surface.

14. The pull-out faucet of claim 12, wherein a plurality of grooves are formed on an end surface of the locking ring facing away from the restricting portion.

15. The pull-out faucet of claim 14, wherein the plurality of grooves are arranged on a periphery of the locking ring and spaced apart from one another by an equal distance.

* * * * *